United States Patent
Fothergill et al.

(10) Patent No.: US 11,946,572 B2
(45) Date of Patent: Apr. 2, 2024

(54) THREADED CONNECTION INCLUDING AND INTERMEDIATE SHOULDER

(71) Applicants: VALLOUREC OIL AND GAS FRANCE, Aulnoye-Aymeries (FR); NIPPON STEEL CORPORATION, Chiyoda-ku (JP)

(72) Inventors: Alan Fothergill, Boulogne-Billancourt (FR); Corey Dufrene, Boulogne-Billancourt (FR); Satoshi Maruta, Chiyoda-ku (JP)

(73) Assignees: VALLOUREC OIL AND GAS FRANCE, Aulnoye-Aymeries (FR); NIPPON STEEL CORPORATION, Chiyoda-ku (JP)

( * ) Notice: Subject to any disclaimer, the term of this patent is extended or adjusted under 35 U.S.C. 154(b) by 0 days.

(21) Appl. No.: 17/763,446

(22) PCT Filed: Sep. 22, 2020

(86) PCT No.: PCT/EP2020/076430
§ 371 (c)(1),
(2) Date: Mar. 24, 2022

(87) PCT Pub. No.: WO2021/058481
PCT Pub. Date: Apr. 1, 2021

(65) Prior Publication Data
US 2022/0341518 A1   Oct. 27, 2022

(30) Foreign Application Priority Data
Sep. 24, 2019 (EP) .................. 19199254

(51) Int. Cl.
*F16L 15/00* (2006.01)
*E21B 17/042* (2006.01)

(52) U.S. Cl.
CPC ......... *F16L 15/002* (2013.01); *E21B 17/0423* (2013.01)

(58) Field of Classification Search
CPC .... F16L 15/002; F16L 15/004; E21B 17/0423
See application file for complete search history.

(56) References Cited

U.S. PATENT DOCUMENTS

| 4,795,200 A | 1/1989 | Tung |
| 2004/0262919 A1 | 12/2004 | Dutilleul et al. |

(Continued)

FOREIGN PATENT DOCUMENTS

WO    WO 2017/097700 A2    6/2017

OTHER PUBLICATIONS

International Search Report dated Nov. 13, 2020 in PCT/EP2020/076430 filed Sept. 22, 2020, 4 pages.

*Primary Examiner* — Zachary T Dragicevich
(74) *Attorney, Agent, or Firm* — Oblon, McClelland, Maier & Neustadt, L.L.P.

(57) ABSTRACT

A threaded tubular connection comprises a first tubular (12) component and a second tubular component (14). The first tubular component (12) includes a female portion (10) defined on an interior surface of the first tubular component. The female portion includes an inner threaded portion (16*d*) and an outer threaded portion (16*b*) which are offset radially with respect to a longitudinal axis of the first tubular component by a first shoulder (26). The second tubular component (14) includes a male portion (18) defined on an exterior surface of the second tubular component. The male portion is to be inserted into the female portion, and includes an inner threaded portion (18*d*) and an outer threaded portion (18*b*) which are offset radially with respect to a longitudinal axis of the second tubular component by a second shoulder (28). The second shoulder is to abut the first shoulder once the male portion is connected to the female (Continued)

portion. The threaded tubular connection comprises an inner short length fluid tight seal.

20 Claims, 6 Drawing Sheets

(56) References Cited

U.S. PATENT DOCUMENTS

| | | | |
|---|---|---|---|
| 2014/0084582 A1* | 3/2014 | Elder | F16L 15/002 |
| | | | 285/334 |
| 2015/0240570 A1* | 8/2015 | Oku | E21B 17/0423 |
| | | | 285/334 |
| 2017/0101830 A1* | 4/2017 | Inose | F16L 15/002 |
| 2017/0167641 A1 | 6/2017 | Daly et al. | |
| 2018/0283109 A1* | 10/2018 | Martin | E21B 17/0423 |
| 2018/0328119 A1* | 11/2018 | Juarez | F16L 15/002 |
| 2022/0010894 A1* | 1/2022 | Inose | E21B 17/0423 |

* cited by examiner

THREADED CONNECTION INCLUDING AND INTERMEDIATE SHOULDER

BACKGROUND OF THE INVENTION

Field of the Invention

The present disclosure relates to apparatus and methods for connecting tubular components, and more particularly, metallic tubular components connected by way of a threaded male portion and a threaded female portion that are formed on longitudinal ends of the tubular components.

Description of the Related Art

Certain types of threaded tubular connections are primarily used to connect tubular components that form casing strings, tubing strings, or drill pipe strings to locate or transport hydrocarbon as part of oil wells or the like. Threaded tubular connections are used on casing strings for providing borehole stability, and or to provide a smooth borehole to allow passage of smaller casing strings, tubing or tools. Such threaded tubular connections are subjected to a variety of combination of stresses that also fluctuate in intensity. For example, the stress may be one or a combination of axial tension or axial compression or internal pressure, or external fluid pressure, bending force, torsional force, etc. Tubular connections are designed to withstand rupture and also provide tight liquid-sealing or gas-sealing despite the combination of stresses and difficult operating conditions. The stresses may change in nature as the pipes are lowered into the well or during operation. For example, tensile stresses may temporarily change to compressive stresses.

There exists a variety of hydrocarbon carrying tubes that yield satisfactory results in terms of mechanical characteristics and tightness. Some involve the use of tubular elements each having one male threaded end and one female threaded end, making for a thin assembly. These assemblies are generally called integral assemblies or connections, in contrast with assemblies or T&C connections employing a coupling or sleeve.

Such integral assemblies are generally made on tubes whose diameter at the end corresponding to the female threading is expanded and whose diameter at the end corresponding to the male threading is reduced. This may be done in order to have sufficient material in the thickness of the tubes to ensure the geometric and mechanical strength of the assembly that joins the tubes.

SUMMARY OF THE INVENTION

In one aspect, a threaded tubular connection comprises a first tubular component and a second tubular component. The first tubular component includes a female portion defined on an interior surface of the first tubular component. The female portion includes an inner threaded portion and an outer threaded portion which are offset radially with respect to a longitudinal axis of the first tubular component by a first shoulder. The female outer threaded portion is closer from a female axial free end than the female inner threaded portion. The second tubular component includes a male portion defined on an exterior surface of the second tubular component. The male portion is to be inserted into the female portion. The male portion includes an inner threaded portion and an outer threaded portion which are offset radially with respect to a longitudinal axis of the second tubular component by a second shoulder. The second shoulder is to abut the first shoulder once the male portion is connected to the female portion. The female portion comprises an inner end portion. The female inner end portion comprises a conical section. The male portion comprises an outer end portion extending between the male inner threaded portion and a male free end. The male outer end portion comprises a domed section. The domed portion and the conical section contact to form an internal fluid tight seal once the male portion is connected to the female portion. Such internal fluid tight seal is set up by defining a seal interference, determined radially, prior make up, between respectively the domed portion outer diameter and the conical section inner diameter.

The domed section comprises axial extremities such that a farthest axial extremity of that domed section from the free end is at an axial length of that male free end less than 10 mm. Such restricted axial length allows to use less width of the pipe wall to provide that seal, and allows to provide both male and female inner and outer threaded portions radially closer from the inner diameter of respective first and second tubulars.

The inner end portion of the female portion includes a terminal shoulder to accommodate the male outer end portion, such that the male free end and the terminal shoulder are spaced apart downstream of the fluid tight seal, such that an axial gap between 0.3 to 3 mm is observed between the male free end and the terminal shoulder. The terminal shoulder of the female inner threaded portion and a surface of the male free end are perpendicular to the axis of the connection. This design helps manufacturing process, and is easier to control after machining.

The female inner end portion extends from that terminal shoulder to the female inner threaded portion such that an axial length of the female inner end portion be more than 10 mm. But an axial length of the conical section of the female inner end portion is preferably less than 10 mm. the domed section and the conical section contact to form a fluid tight seal, such that an axial length of that fluid tight seal once the male portion is connected to the female portion is less than 8 mm. The seal is obtained by radial interference with a maximum radial interference of 1 mm, or with a maximum diametrical interference of 2 mm.

The reduced taper angle of the internal fluid tight seal allows for more material to be available to machine the other parts, and especially inner and outer threaded portion and shoulder of the joint. With the internal fluid tight seal of the invention there is no more need for a thicker pipe than those acceptable according to API standard. The internal fluid tight seal being closer from the inner diameter of respective first and second tubulars, pipe width at the critical cross section is then higher, or at least equivalent to that of a pipe in the highest level of tolerances for pipe width. Same properties are reached with all pipes within API tolerances. Pipe remaining width at the critical cross-section reduces the overall plastic deformation of the critical cross section and increases the demonstrated service load envelope.

For example, a taper of the conical section of the female inner end portion may be comprised between 15% and 25%. Preferably, the domed section may be defined by a single radius of curvature between 10 and 100 mm, more preferably between 10 and 40 mm, even more preferably between 20 and 30 mm, and for example equal to 25 mm. The larger radius ensures that the radius on the pin will maintain contact with the conical part surface of the pin even when the pin is deflected during usage. In particular, an extremity of the domed section, closest to the free end, tangentially connects a male conical surface (51), such that a taper of that male conical surface is higher than the taper of the conical section of the female inner end portion. Now thanks to the seal design of the present invention, with the relative large radius, even though the pin is deflected the contact is maintained due to it being a radius, and level of performances under internal or external pressure, and tension and compression cycles are maintained. Radius is selected not to be too high in order to allow for a more concentrate pressure contact zone. A radial gap is defined between the male conical surface and the conical section of the female inner end portion in order to prevent any contact at make up and also under compression or tension, at a location that is not with the domed section.

The female inner end portion may comprise a groove between the female inner threaded portion and the conical section of the female inner end portion, such that at least part of the inner threaded portion of the male portion is located in the groove once the male portion is connected to the female portion. Critical cross section may be define at the groove location. The groove comprises a cylindrical portion connected by a steeper tapered portion to the conical section of the female inner end portion, such steeper tapered portion forming an angle between 5° and 45°, preferably between 20° and 30°, for example between 24° and 26°, with a target value equal to 25° with an axis of the threaded connection (X).

The female portion may comprise a female outer tapered portion between the female outer threaded portion and a female free end, and correspondingly the male portion may comprise a male outer tapered portion defined between the male outer threaded portion and a pipe body of the second tubular, such that the outer tapered portions of the male and female portions contact to form a second fluid tight seal once the male portion is connected to the female portion, outer tapered portions of the male and female portions having a steeper taper than the conical section of the female inner end portion of the female portion.

The inner threaded portion and the outer threaded portion of the female portion and the inner threaded portion and the outer threaded portion of the male portion are tapered at a value ranging from 5.26% to 6.25%, preferably at 6% or less, more preferably between 5.5% and 5.6%. The inner threaded portion and the outer threaded portion of the female portion and the inner threaded portion and the outer threaded portion of the male portion include teeth with a crest surface and a root surface, preferably the thread being trapezoidal teeth. The crest surface and the root surface are flat and parallel to the longitudinal axis of the respective tubular component. The inner threaded portion and the outer threaded portion of the female portion and the inner threaded portion and the outer threaded portion of the male portion include teeth, such that a plurality of those teeth being shorter teeth at each longitudinal end.

When the second shoulder abuts the first shoulder, a mated shoulder contact area is defined, the mated shoulder contact area being identical in the first shoulder and the second shoulder. A ratio of the mated shoulder contact area to an area of a nominal cross-section of the first tubular component is more than 15% and less than 25%, and a ratio of the mated shoulder contact area to an area of a nominal cross-section of the second tubular component is more than 15% and less than 25%.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
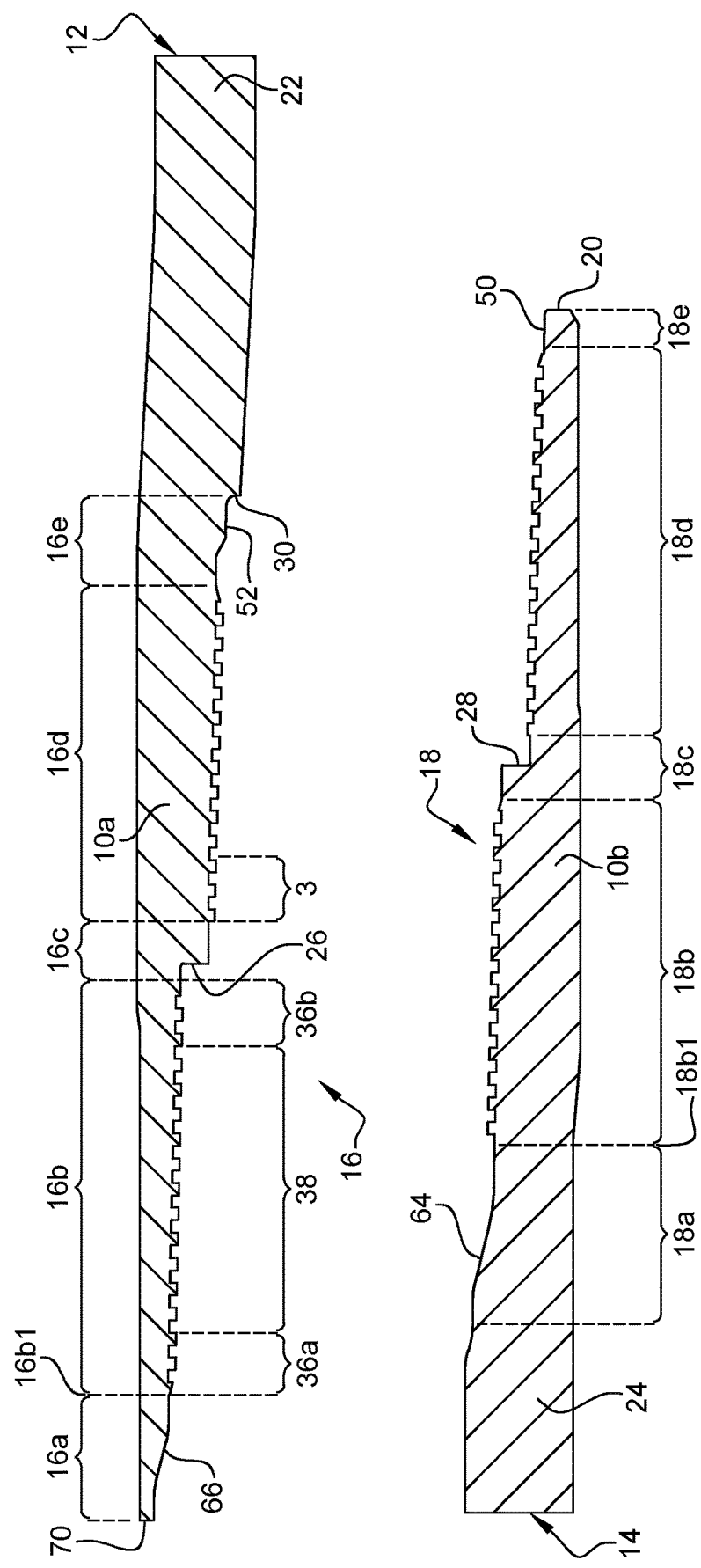
FIG. 1 is a partial cross-sectional view of an example embodiment of one half a first end of a first tubular component and an example embodiment of one half of a second end of a second tubular component in a disconnected state.

Referring now to the drawings, wherein like reference numerals designate identical or corresponding parts throughout the several views.

Threaded connections disclosed herein relate to tubular components that are connected to form a tubular structure capable of reaching great length. The tubular structure assembled using the tubular components disclosed herein form an internal channel that allows fluid such as oil, gas, water or the like to move there through.

Referring to FIG. 1, an example embodiment of a threaded tubular connection 10 between a first tubular component 12 and a second tubular component 14 is illustrated in a disconnected state. The first tubular component 12 and the second tubular component 14 may be identically shaped such that each of the first tubular component 12 and the second tubular component 14 may include the female portion 16 at the first end 10a and the male portion 18 at the second end 10b. Specifically, FIG. 1 shows a cross-sectional view across an upper half portion of the first end 10a of the first tubular component 12 and a cross-sectional view across an upper half portion of the second end 10b of the second tubular component 14. The entirety of the cross-section of the first end 10a of the first tubular component 12 and the second end 10b of the second tubular component 14 is not shown for clarify of illustration.

Figure 7:
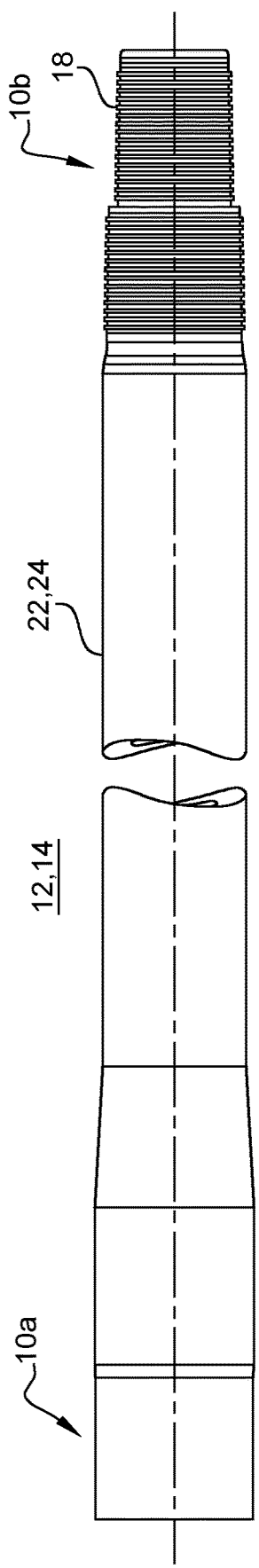
FIG. 7 is a side view of an example embodiment of a tubular component including the first end and the second end.

FIG. 7 shows an example embodiment of a tubular component in its entirety. The tubular component of FIG. 7 may be either the first tubular component 12 or the second tubular component 14. The first end 10a and the second end 10b may also be referred to as the upstream end and the downstream end in view of the orientations that the tubular components 12, 14 will assume after assembly. The first tubular component 12 may be defined by a first wall 22 while the second tubular component 14 may be defined by a second wall 24. The first wall 22 and the second wall 24 have the same nominal wall thickness, and the same outer diameter, at a location away from their respective male and female portions.

Figure 8:
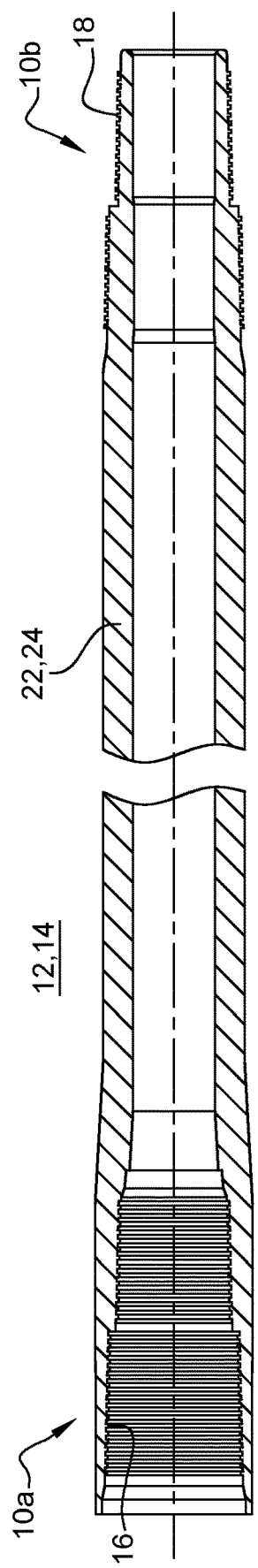
FIG. 8 is a side, cross-sectional view of the tubular component in FIG. 8 cut along a longitudinal axis of the tubular component.

FIG. 8 shows a cross-sectional view of the tubular component in which the tubular component is cut along a longitudinal axis of the tubular component. The first end 10a of the first tubular component 12 is configured with a female portion 16 of the threaded tubular connection 10 which is also referred to as a box. The female portion 16 is formed on an interior or interior surface of the first wall 22, such that a thickness of the first wall 22 gradually decreases to from a nominal wall thickness along the female portion 16 in a leftward direction in FIG. 1. The outer diameter of the first end 10a of the first tubular component 12 may be enlarged along the female portion 16 relative to other longitudinally located portions of the first tubular component 12.

Figure 2:
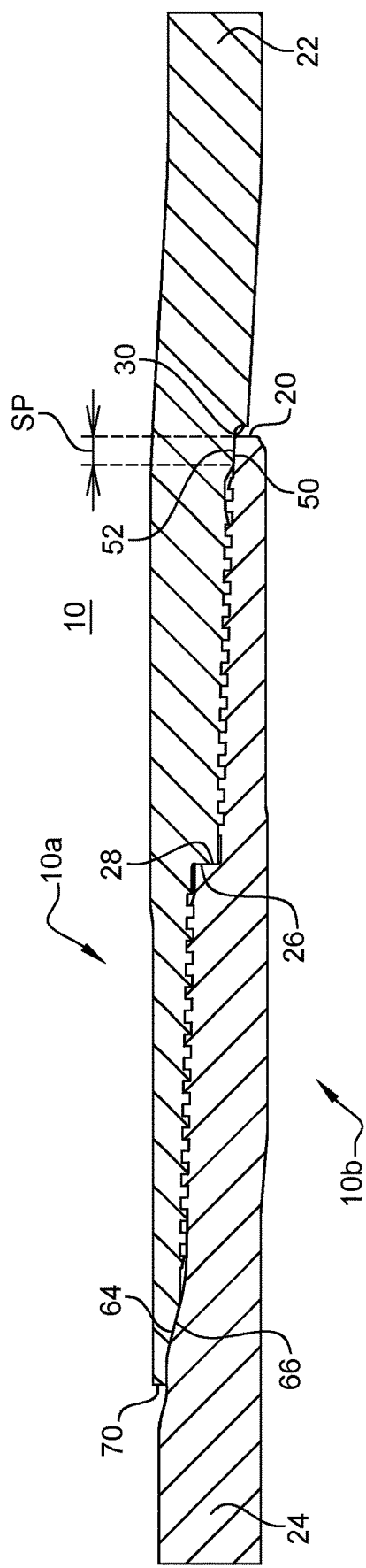
FIG. 2 is a partial cross-sectional view of the one half of the first end of the first tubular component and the one half of the second end of the second tubular component in a connected state.

The second end 10b of the first tubular component 12 is configured with the male portion 18 of the threaded tubular connection 10 which is also referred to as a pin. The male portion 18 is formed on an exterior or exterior surface of the second wall 24, such that a thickness of the second wall 24 may gradually decrease from a nominal wall thickness along the male portion 18 in a rightward direction in FIG. 1. The inner diameter along the male portion 18 may be the same as other longitudinally located portions of the second tubular component 14. The inner diameter along the male portion 18b may be decreased due to an end sizing process as shown in FIGS. 1 and 2. The male portion 18 of the first tubular component 12 is configured to be inserted into and interlock with the female portion 16 of the second tubular component 14 as shown in FIG. 2. As such, the length of the male portion 18 and the length of the female portion 16 may be substantially similar.

The female portion 16 may include an outer end portion 16a, an outer threaded portion 16b, a first shoulder portion 16c, an inner threaded portion 16d and an inner end portion 16e. The outer end portion 16a may include a substantially frustoconical opening for entry by the male portion 18. The outer threaded portion 16b and the inner threaded portion 16d in the female portion 16 are configured to interlock by thread engagement with corresponding features in the male portion 18. The outer threaded portion 16b and the inner threaded portion 16d are tapered such that the first wall 22 gradually thickens along the female portion 16 in the rightward direction in FIG. 1. The teeth of the threaded portions will be described later in more detail. The outer threaded portion 16b and the inner threaded portion 16d of the female portion 16 may be offset radially with respect to the longitudinal axis X of the tubular component 12 and transversely with respect to the first wall 22 by the first shoulder portion 16c that may include a first transverse surface 26. While the first transverse surface 26 in FIGS. 1-2 are shown to be radially oriented about the longitudinal axis X of the tubular component 12, the first transverse surface 26 may be embodied in a different orientation.

The male portion 18 may include an outer end portion 18a, an outer threaded portion 18b, a second shoulder portion 18c, an inner threaded portion 18d, and an inner end portion 18e. The outer end portion 18a may be frustoconically shaped to substantially fit within the frustoconical opening of the outer end portion 16a of the female portion 16. The outer threaded portion 18b and the inner threaded portion 18d in the male portion 18 are configured to be accommodated by thread engagement and interlock with respectively the outer threaded portion 16b and the inner threaded portion 16d of the female portion 16. The outer threaded portion 18b and the inner threaded portion 18d in the male portion 18 may be tapered such that the second wall 24 gradually thins along the male portion 18 in the rightward direction in FIG. 1 and as described in more detail with regard to FIG. 4. The inner threaded portion 18d and the outer threaded portion 18b of the male portion 18 may be offset radially with respect to the longitudinal axis of the tubular component 14 and transversely with respect to the second wall 24 by the second shoulder portion 18c.

The second shoulder portion 18c may include a second transverse surface 28 that contacts the first transverse surface 26 once the male portion 18 is threadably connected, or mated, with the female portion 16 as shown in FIG. 2. The second transverse surface 28 need not be oriented perpendicularly about the longitudinal axis of the tubular component 14 as long as the second transverse surface 28 is oriented similarly to the first transverse surface 26. The inner end portion 16e of the female portion 16 may be shaped to accommodate the inner end portion 18e of the male portion 18. Specifically, the inner end portion 16e of the female portion 16 may include a terminal shoulder 30 and the inner end portion 18e of the male portion 18 may include a male axial free end 20 respectively as will be described later in more detail. Moreover, the outer diameter of each tubular component 12, 14 may be constant except at the first end 10a and the second end 10b. The outer diameter of each tubular component 12, 14 may be at its largest along the first end 10a and may be at its smallest along the second end 10b. Furthermore, the inner diameter of each of the tubular component 12, 14 may be constant except along the first end 10a and the second end 10b as shown in the connected state of FIG. 2. The inner diameter of the tubular components 12, 14 may be at its largest along the first end 10a and may be at its smallest along the second end 10b.

FIG. 2 illustrates how the female portion 16 of the first end 10a and the male portion 18 of the second end 10b interlock once the male portion 18 is inserted and threaded into the female portion 16 to reach a connected state. The first transverse surface 26 of the female portion 16 and the second transverse surface 28 of the male portion 18 are configured to abut one another in the connected state. Thus, the geometry of the first and second transverse surfaces 26, 28 affects the compressive load capacities of the threaded connection. The transverse surfaces 26, 28 may be annularly shaped. In one embodiment, a mated shoulder contact area of the annular first transverse surface 26 of the first shoulder portion 16c may be more than 15% and less than 25% of an area of a nominal cross-section of the first tubular component 12 while a mated shoulder contact area of the annular second transverse surface 28 of the second shoulder portion 18c may be more than 15% and less than 25% of the area of a nominal cross-section of the second tubular component 14.

A nominal cross-section of a tubular component may be defined as a cross-section across the tubular component at a section other than the first end 10a or the second end 10b where the tubular component has a nominal outer diameter and a nominal inner diameter. In another embodiment, the mated shoulder contact area of the annular first transverse surface 26 of the first shoulder portion 16c may be more than 17% and less than 23% of the area of a nominal cross-section of the first tubular component 12 while the mated shoulder contact area of the annular second transverse surface 28 of the second shoulder portion 18c may be more than 17% and less than 23% of the area of a nominal cross-section of the second tubular component 14. The first shoulder portion 16c and the second shoulder portion 18c may help provide support against compressive loads acting in axial directions of the tubular components 12, 14.

Figure 3:
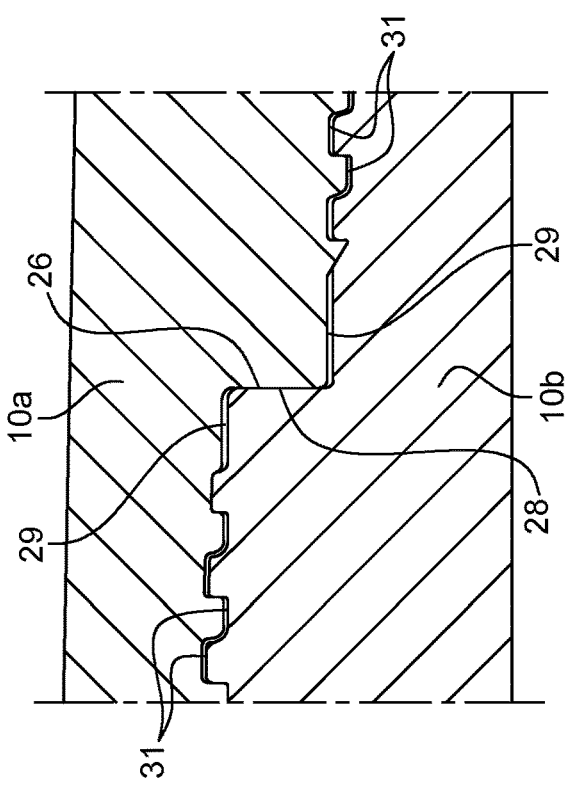
FIG. 3 is a close-up, partial cross-sectional view of a first shoulder portion of the first tubular component and a second shoulder portion of the second tubular component in the connected state.

Moreover, the shapes of the female portion 16 and the male portion 18 are such that gaps 29, 31 are formed between an inner surface of the female portion 16 and an outer surface of the male portion 18 at predetermined regions along the longitudinal axes of the tubular components 12, 14. The gaps may function to facilitate assembly between the female portion 16 and the male portion 18 to ease the make up. For example, as shown in FIG. 3, gaps 29 may be provided adjacent to the first and second shoulder portions 16c, 18c to facilitate assembly of the tubular components 12, 14.

A threaded portion, whether it is the inner threaded portion 16d or 18b or the outer threaded portion 16b or 18d or whether it is part of the male portion 18 or the female portion 16, may include teeth of varying shapes. As shown in FIG. 1, a given threaded portion may be divided into two longitudinal end regions 36a, 36b and an intermediate region 38 located between the two longitudinal end regions 36a, 36b. Within a given threaded portion, the teeth 32 may have the same length, wherein stabbing flanks lead and loading flanks lead within a threaded portion are equal to each other. Within a given threaded portion, the teeth 32 may vary in height such that the intermediate region 38 are made up entirely of tall, fully formed teeth 32 while the longitudinal end regions 36a, 36b are made up of shorter teeth 34. The shorter teeth 34 may have the same length but may also vary in height from one another or vary in shape. The shorter teeth 34 may also be a trapezoid. Both of the shorter teeth 34 and the fully formed teeth 32 may be trapezoidal but the shorter teeth 34 may be a differently shaped trapezoid. Moreover, each of the longitudinal end regions 36a, 36b of the threaded portion may include a plurality of shorter teeth 34. Furthermore, the shorter teeth 34 may gradually increase in height as they approach the intermediate region 38 and may gradually decrease in height as they move away from the intermediate region 38.

Figure 4:
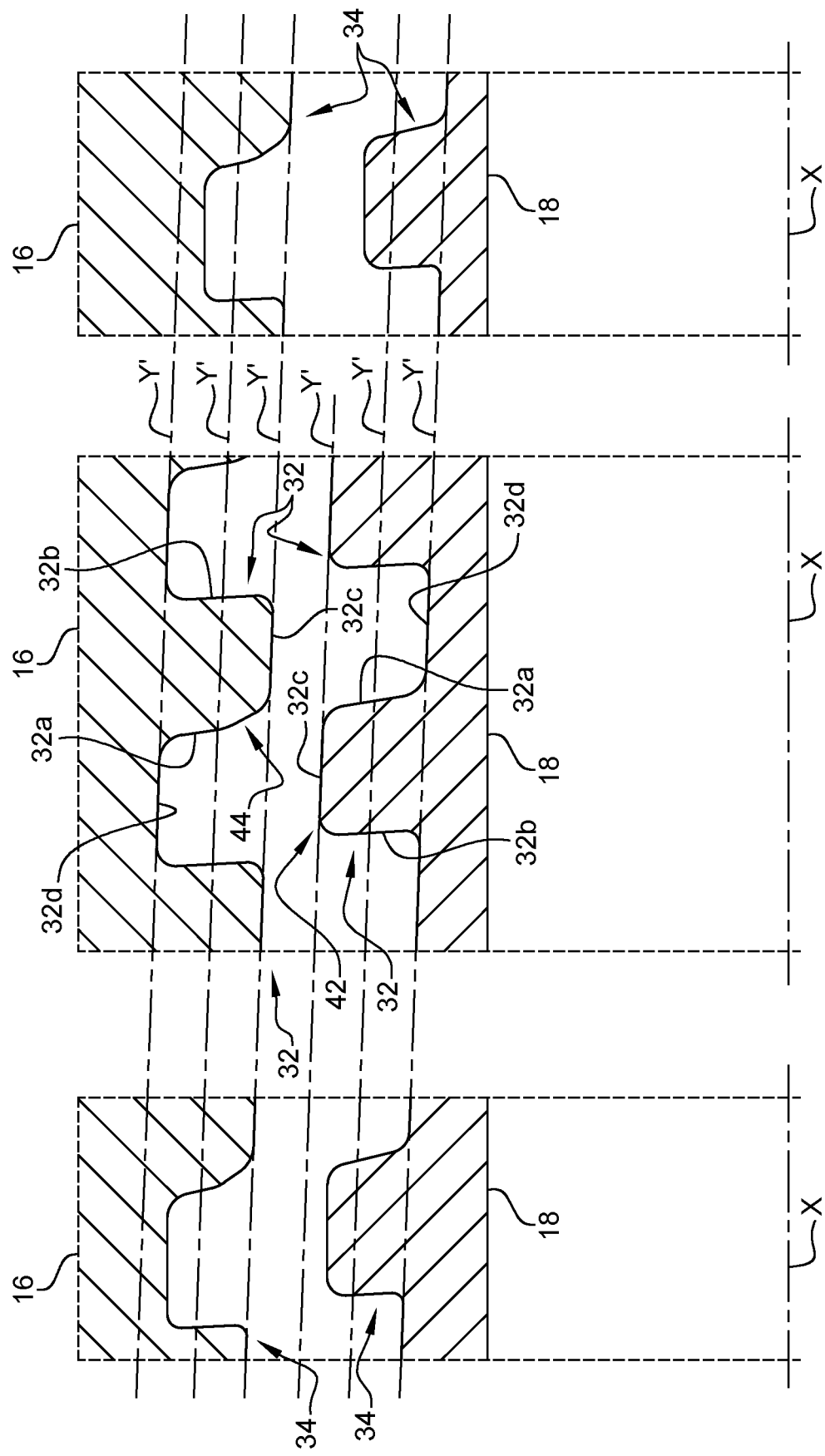
FIG. 4 is a close-up, partial cross-sectional view of an example embodiment of a set of teeth of a threaded portion of the first tubular component and a set of teeth of a threaded portion of the second tubular component in the disconnected state.

FIG. 4 is a close-up view of teeth 32 which may make up part of the outer threaded portion 16b and the inner threaded portion 16d of the female portion 16 or the outer threaded portion 18b and the inner threaded portion 18d of the male portion 18. In FIG. 4, teeth of the female portion 16 and the male portion 18 are shown in a disconnected state.

As shown in FIG. 4, a tooth with a trapezoidal configuration may include a stabbing flank 32a, a loading flank 32b, a crest surface 32c and a root surface 32d. In one embodiment of the fully formed trapezoidal teeth 32, the crest surface 32c and the root surface 32d may be cylindrical such that the crest surface 32c and the root surface 32d are flat and parallel to one another along a cross-section in the longitudinal direction as shown in FIG. 4. The crest surface 32c and the root surface 32d are spaced apart from one another to provide a pocket 31 where grease may stay, such pocket 31 creating a helical path for the grease (FIG. 3). Moreover, the crest surface 32c and the root surface 32d may be parallel to a longitudinal axis X of the tubular component 12, 14. However, the fully formed teeth 32 in the intermediate region 38 may be formed to taper along the intermediate region 38 such that tapering axis Y is at an angle with the longitudinal axis X of the tubular component as shown in FIG. 4.

In one embodiment of the female portion 16, the tapering axis Y may be such that the inner diameter of the female portion 16 along the outer threaded portion 16b and the inner threaded portion 16d decreases approximately by a value ranging from 1 inch for every 16-inch interval in length to 1 inch for every 19-inch interval in length in the rightward direction in FIG. 4. Similarly, in one embodiment of the male portion 18, the tapering axis Y may be such that the outer diameter of the male portion 18 along the outer threaded portion 18b and the inner threaded portion 18d decreases approximately by a value ranging from 1 inch for every 16-inch interval in length to 1 inch for every 19-inch interval in length in the rightward direction in FIG. 4. FIG. 4 further shows axes Y' that are parallel to the tapering axis Y and that are tangential to the crest surfaces 32c and the root surfaces 32d.

Figure 5:
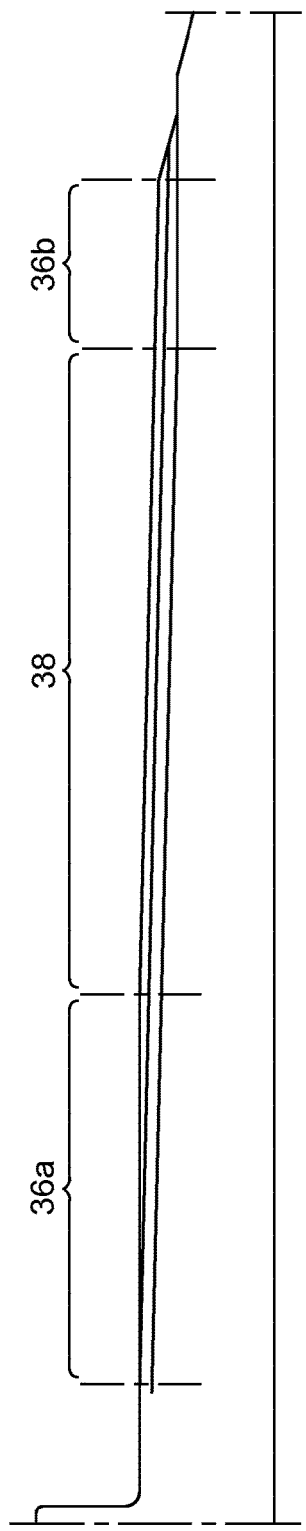
FIG. 5 is a schematic view of the example embodiment of longitudinal end regions and an intermediate region within a given threaded portion.

In the embodiment of a threaded portion shown schematically in FIG. 5, the fully formed teeth 32 in the intermediate region 38, as well as shorter height teeth 34 of both longitudinal end regions 36a and 36b, may include a crest surface 32c and a root surface 32d that parallel with the longitudinal axis X. As shown in FIG. 5, the longitudinal end regions 36a, 36b may occupy portions of a threaded portion that are different in length such that one longitudinal end region includes a larger number of shorter teeth than the other longitudinal end region. In the connected state, the crest surfaces 32c are spaced apart from the root surfaces 32d in order to allow a pocket 31 shaped as a helical path for the lubricant (FIG. 3).

Furthermore, while the teeth 32 of the male portion 18 and the teeth 32 of the female portion 16 may be correspondingly shaped so as to fit closely with one another, the teeth shape of the male portion 18 and the teeth shape of the female portion 16 may form one or more pockets. For example, in the embodiment of FIG. 4, the corner between the loading flank 32b and the crest surface 32c of the male portion 18 may include a beveled area 42 that provides some space between the tooth 32 of the male portion 18 and the tooth 32 of the female portion 16 in this first region. Also, the corner between the stabbing flank 32a and the crest surface 32c may include a beveled area 44 that creates a pocket between the tooth 32 of the male portion 18 and the tooth 32 of the female portion 16 in this second region as shown in FIG. 4. Such a pocket may allow lubricant applied to the female portion 16 and the male portion 18 to be collected therein or may be provided to facilitate the threaded connection between the tubular components 12, 14. Such a pocket also improves both sliding and making up performances of the male portion 18 into the female portion 16.

Figure 6:
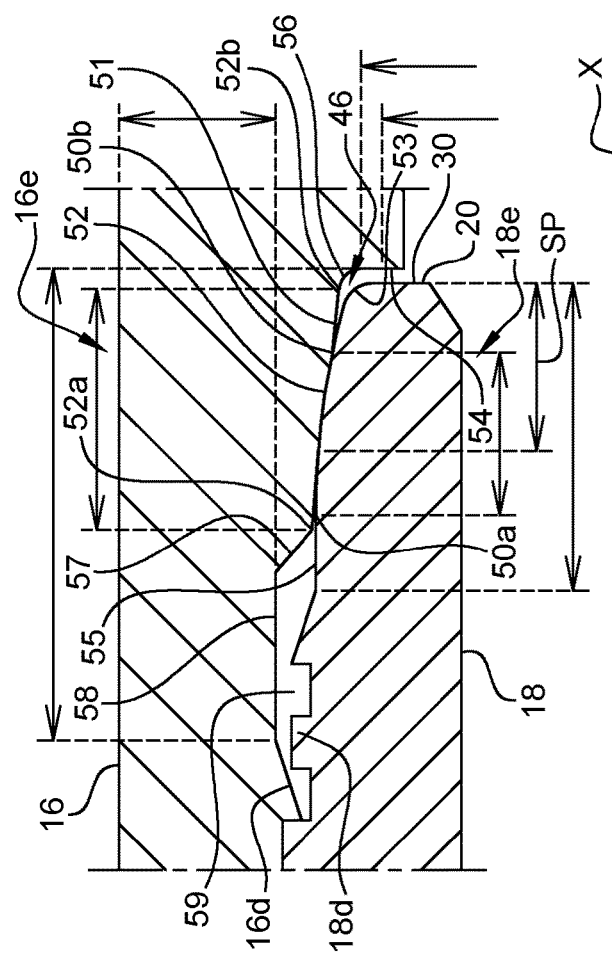
FIG. 6 is a close-up, partial cross-sectional view of an example embodiment of a free end of the male portion and a terminal shoulder of the female portion in the connected state.

Further, as discussed above, the male portion 18 may include the free end 20 at its inner end portion 18e and the inner end portion 16e of the female portion 16 may include the terminal shoulder 30 that is shaped to accommodate the free end 20 of the male portion 18 as shown in FIG. 6. The inner end portion 16e is defined between a terminal shoulder 30 and the inner threaded portion 16d. The inner end portion 18e is defined between the inner threaded portion 18d and the male axial free end 20. An axial length, along X axis, of the inner end portion 18e may be less than 10 mm. An axial length, along X axis, of the inner end portion 18e is less than 10%, and even preferably below 8%, of the axial length defined between an external extremity 18b1 of the outer threaded portion 18b and the free end 20, the external extremity 18b1 being the closest point of that outer threaded portion 18b from a part of the tubular component 14 where thickness of the wall 24 is at its maximum width, that maximum width of the wall 24 being a nominal width of that tubular component 14.

While the inner end portion 16e is configured to accommodate the inner end portion 18e, the inner end portion 16e and the inner end portion 18e may contact each other only in a limited area to form a fluid tight seal. A box surface 52 of the inner end portion 16e may be adapted to contact a pin surface 50 of the inner end portion 18e.

The pin surface 50 is formed in a domed configuration, having a relatively large radius of curvature, while the box surface 52 being formed in a conical configuration such that a fluid tight seal may be formed along these surfaces 50, 52. The seal provided there is of the metal-to-metal seal type. An interference fit is determined when the connection is designed such that a given difference of diameter is determined at a specific location such that in a connected state, pin surface 50 is radially force fitted against box surface 52 having locally a smaller diameter than the one provided for the domed surface 50. For example a maximum seal interference is determined between 0.1 and 1 mm in the radial dimension, so equivalent to 0.2 and 2 mm in a diametrical dimension.

A maximum seal interference point may be determined where the surfaces 50 and 52 contact each other. Seal provided in the invention is a seal for gas and/or liquid.

For example that maximum seal interference point may be located at an axial distance SP, along the X axis, from the male free end 20. Maximum seal interference point may be located away from extremities 50a and 50b of the domed portion 50. Extremities, also called extreme points, 50a and 50b of the domed section 50 are respectively at a non-zero distance from the free end 20. For example, extremity 50b is closest to free end 20, whereas extremity 50a is the farthest from the free end 20. Closest extremity 50b from the free end is at an axial distance below 2 mm, preferably below 1.8 mm from an axial most point of that free end 20. Extremity 50a farthest to the free end 20 is at an axial distance below 10 mm from that free end 20. Distance between extremities 50a and 50b along X axis is preferably below 8 mm, and even more preferably below 5 mm. If technical drawings representing the pin end and the box end would be superimposed, then in a made up position, overlap between domed section 50 and box conical surface 52 would be less than 8 mm, and preferably less than 5 mm. In a real made up position of respective female portion 16 with the male portion 18, then an axial length of the fluid tight seal would be less than 3, even better less than 2 mm, due to deflection of the male inner end 18e.

The domed surface 50 may preferably formed of a single radius of curvature, for example the radius of curvature is chosen between 10 and 40 mm, preferably between 20 and 30 mm, for example equal to 25 mm. The domed surface 50 connects at extremity 50b tangentially to a conical surface 51. Conical surface 51 connects through a radiused portion 53 to a surface 54 of the free end 20. Surface 54 is preferably perpendicular to the X axis. Optionally surface 54 may be an inverted tronconical surface defining an angle between −10° and 0° compared to a perpendicular to the X axis. The conical surface 51 may be tapered with an angle between 20% and 50% compared to the axis X. Taper of the conical surface 51 may be for example be of 35%. Radiused portion 53 is preferably defined with a radius below 3 mm, preferably below 2 mm. The domed surface 50 connects at extremity 50a tangentially to a cylindrical surface 55. Cylindrical surface 55 is adjacent to the inner threaded portion 18d.

The domed surface 50 with a domed configuration may alternatively have more than one radii of curvature. Box surface 52 being formed in a conical configuration, it may be defined by a taper between 15 and 25%, for example between 19.8% and 20.2% with a target value of 20%.

Preferably taper of box conical surface 52 in the box is lower than taper of conical surface 51 of the pin. For example, a difference between angle of respective box conical surface 52 and male conical surface 51 is about 5°.

Tapered surface 52 connects at an extremity 52b with a concave radiused portion 56 to a terminal shoulder surface 48 of the terminal shoulder 30. Concave radiused portion 56 is preferably defined with a radius below 3 mm, preferably below 2 mm. Radiused portion 53 and concave radiused portion 56 may have the same radius of curvature. Preferably concave radiused portion 56 is having a greater radius of curvature than radiused portion 53 of the pin.

FIG. 6, terminal shoulder surface 48 is oriented in a radial plan to the X axis. In addition, the male free end 20 and the terminal shoulder 30 of the box may be configured to be in a spaced apart relationship such that surface 54 of the male free end 20 and shoulder surface 48 remain parallel. At make-up a remaining distance is observed between surface 54 of the male free end 20 and shoulder surface 48. For example, that remaining distance may be an axial gap of 0.3 to 3 mm.

Alternatively, terminal shoulder surface 48 may not be perpendicular to X axis while remaining spaced away from surface 54 of the male free end 20. In order to facilitate assembly, and preserve seal, a radial space 46 is defined between radiused portions 53 and 56, such that radial space 46 is also defined between the male conical portion 51 and the female conical surface 52.

Opposite to the concave radiused portion 56, tapered surface 52 comprises a second extremity 52a. Tapered surface 52 connects at extremity 52a to a steeper tapered portion 57, such steeper tapered portion 57 presenting a taper between 5° and 45° compared to the X axis, preferably between 20° and 30°, for example of 25°. Taper of the steeper tapered portion 57 is greater than that of the tapered surface 52. Steeper tapered portion 57 connects a cylindrical portion 58 adjacent to the female inner threaded portion 16d in order to provide a groove on the inner surface of inner end portion 16e.

The groove provided below cylindrical portion 58 helps machining process and provide room for a thread cutting tool to be removed from the female inner threaded portion 16d at the end of machining. According to the thread profile selected in the present invention, steeper tapered portion 57 needs to be not too small in order to avoid a lengthy unsupported length of the female element not engaged into contact with a thread or a sealing surface. On the other hand, steeper tapered portion 57 needs to be not too high in order to avoid creating a hoop stress at the junction between that steeper tapered portion 57 and the cylindrical portion 58.

At least one turn of the male inner threaded portion 18d is located below and away from the cylindrical portion 58 when the connection is made up, such that that turn of the male inner threaded portion, for example made of imperfect threads, is not engaged in any corresponding thread turn of the female inner threaded portion 16d. Space 59 in between the cylindrical surface 58 and imperfect thread of the male inner threaded portion 18d defines a pocket, or groove volume, that help to release dope pressure during make up, when the inner tight seal starts being activated, and make-up is not totally completed.

An axial length along X axis, of the female inner end portion 16e is above 10 mm. An axial length, along X axis, of the female inner end portion 16e is between 7 and 10%, preferably between 8 and 9% of an axial length defined between a female axial free end 70 and the terminal shoulder 30. Axial free end 70 of the box may also be called face of the box. Distance between extremities 52a and 52b of the tapered surface 52 along X axis is preferably below 10 mm, and even more preferably below 8 mm. In a made up state of the connection tapered surface 52 extends on both side of the domed surface 50. Tapered surface 52 presents a wider axial length than the domed surface 50.

An imaginary line defined between extremities 50a and 50b of the domed surface 50 is defining an inclination angle compared to the axis X. That inclination angle is smaller than that of the tapered surface 52 with the same axis X.

Figure 9A:
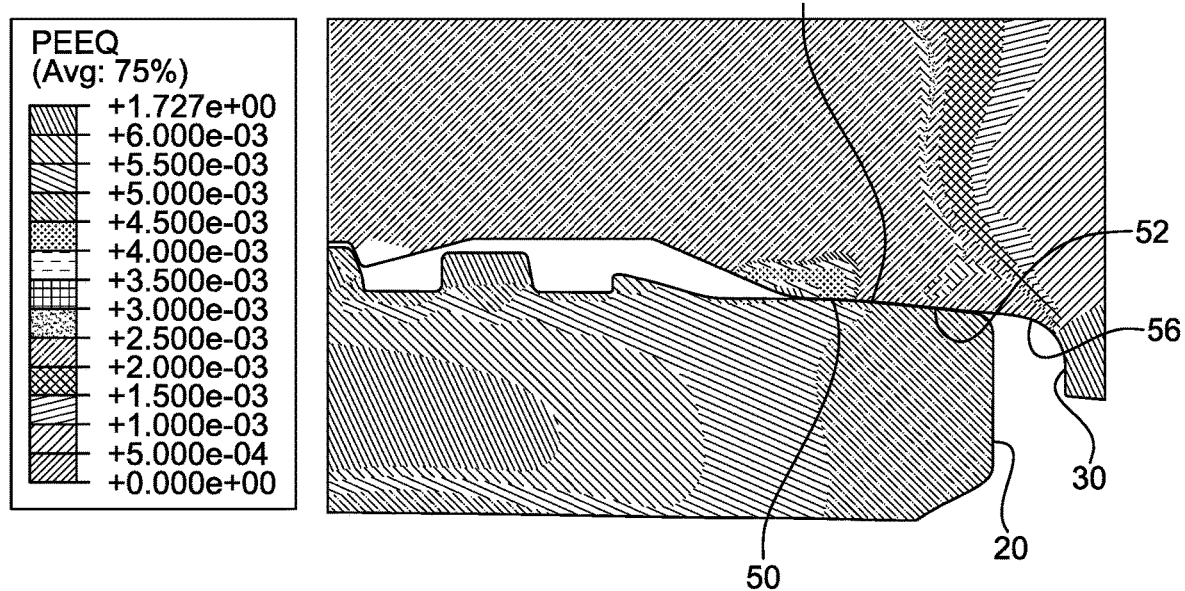
FIGS. 9a and 9b are close up, partial cross sectional view of equivalent plastic strains according to FEA, when the first end is made up with the second end.
Figure 9B:
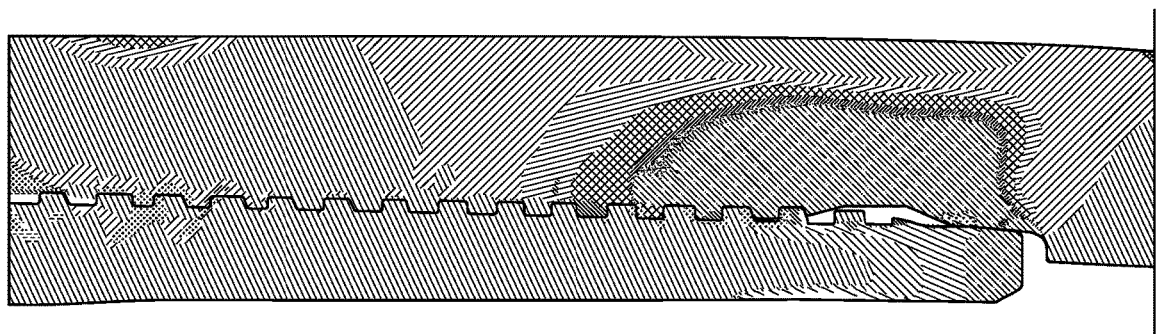

As represented in close up views of FIGS. 9A and 9b, FEA analysis of the strains in the connection at the end of make up, less plastic strains are observed at the outer periphery of the first tubular component 12, above the terminal shoulder 30. In addition, as represented FIG. 9a, no plastification is observed in the terminal shoulder 30, nor the concave radiused portion 56, or the box tapered surface 52.

Further, the outer end portion 16a of the female portion 16 and the outer end portion 18a of the male portion 18 may include a surface 66 and a surface 64 respectively that contact to form a second outer fluid tight seal as shown in FIGS. 1 and 2. Both surfaces 66, 64 may be formed in a conical configuration to accomplish a sealing effect. Surfaces 64 and 66 may be provided with a same taper angle steeper than the one of conical surface 52 needed to perform an inner fluid-tight seal. For example taper of the second outer fluid tight seal is between 25 and 55%, for example around 50%, preferably between 49.8% and 50.2%.

In addition, the surface of the female portion 16 and the surface of the male portion 18 may be treated to provide improved sealing between the tubular components 12, 14. For example, metallic coating may be applied to the inner end portion 18e of the male portion 18 and the inner end portion 16e of the female portion that are configured to contact one another. The coating regions of the outer end portion 18e of the male portion 18 and the inner end portion 16e of the female portion may contact one another once the male portion 18 is inserted into the female portion 16 so as to form a seal and such that fluid moving through the inner channel of the tubular components 12, 14 is prevented from leaking through the junction between the female portion 16 and the male portion 18. The same coating may be applied to the entire connection.

The tubular connection discussed herein is configured with dimensions that result in improved performance in terms of axial load resistance. Specifically, the tapering of the threaded portions allows the shoulder portions 16c and 18c to occupy a larger portion of the thickness of the walls 22, 24 of the tubular components 12, 14. If the inner diameters of the tubular components 12, 14 are diminished, the drift diameter defined for all drilling, or other casing, or tubing or tooling accessories would be deteriorated. Also, if the outer diameters of the tubular components 12, 14 are increased, the tubular structure may no longer be suitable for a borehole drilled for the purpose of accommodating the previously used tubular structure or the tubular structure may interfere with other applications in the borehole. However, because the thicknesses of the walls 22, 24 are not increased and the inner and outer diameters of the tubular components 12, 14 are not significantly affected, the improved resistance to axial compressive loads is made possible without diminishing the fluid carrying capacity of the tubular structure and while maintaining compatibility with the borehole as well as other applications used therein.

The present disclosure applies to several sizes of outer diameters ranging from 7" (177.8 mm) to 16" (406.4 mm), even up to 20" (508 mm), and, in other examples, to sizes ranging from 9⅞" (250.8 mm) to 14" (355.6 mm). The pipe may be made out of steel, and, in one example, carbon martensitic stainless steel, with yield strengths ranging from 80 ksi to 140 ksi. The nominal wall thickness of the walls 22, 24 may range between 0.453 inch (11.5 mm) and 0.820 inch (20.82 mm). The drift diameter may be between 6 inches (152.4 mm) and 14.750 inches (374.65 mm), and in other examples, between 8.5 inches (215.9 mm) and 12.250 inches (311.15 mm).

Obviously, numerous modifications and variations of the present invention are possible in light of the above teachings. It is therefore to be understood that within the scope of the appended claims, the invention may be practiced otherwise than as specifically described herein.

What is claimed is:
1. A threaded tubular connection comprising:
 a first tubular component including a female portion defined on an interior surface of the first tubular component, the female portion including an inner threaded portion and an outer threaded portion which are offset radially with respect to a longitudinal axis of the first tubular component by a first shoulder, the female outer threaded portion being closer from a female free end than the female inner threaded portion; and
 a second tubular component including a male portion defined on an exterior surface of the second tubular component,
 the male portion to be inserted into the female portion, the male portion including an inner threaded portion and an outer threaded portion which are offset radially with respect to a longitudinal axis of the second tubular component by a second shoulder, the second shoulder to abut the first shoulder once the male portion is connected to the female portion,
 wherein an inner end portion of the female portion comprises a conical section,
 wherein an inner end portion of the male portion extending between the male inner threaded portion and a male free end comprises a domed section that is a radiused portion with a single radius of curvature between 10 and 40 mm, such that the domed section and the conical section contact to form a fluid tight seal once the male portion is connected to the female portion, the male domed section comprises extremities including a closest extremity where the domed section tangentially connects to a male conical surface and a farthest extremity where the domed section tangentially connects to a male cylindrical surface, the closest extremity being closer to the male free end than the farthest extremity,
 wherein the farthest extremity of the domed section from the male free end is at an axial length of less than 10 mm and the closest extremity of the domed section from the male free end is at an axial length of less than 2 mm, and
 wherein the male conical surface is closer to the male free end than then male cylindrical surface.

2. The threaded tubular connection according to claim 1, wherein the inner end portion of the female portion includes a terminal shoulder to accommodate the male outer end portion, such that the male free end and the terminal shoulder are axially spaced apart downstream of the fluid tight seal.

3. The threaded tubular connection according to claim 2, wherein the terminal shoulder of the female inner end portion and a surface of the male free end are perpendicular to the longitudinal axis of the first and second tubular components.

4. The threaded tubular connection according to claim 1, wherein an axial length of the conical section of the female inner end portion is less than 10 mm.

5. The threaded tubular connection according to claim 1, wherein the domed section and the conical section contact to form a fluid tight seal, such that an axial length of that fluid tight seal once the male portion is connected to the female portion is less than 8 mm.

6. The threaded tubular connection according to claim 1, wherein the domed section and the conical section contact to form a fluid tight seal, such that an axial length of that fluid tight seal once the male portion is connected to the female portion is less than 3 mm.

7. The threaded tubular connection according to claim 1, wherein the fluid tight seal is obtained by radial interference with a maximum radial interference of 1 mm.

8. The threaded tubular connection according to claim 1, wherein a taper of the conical section of the female inner end portion is between 15% and 25%.

9. The threaded tubular connection according to claim 8, wherein a taper of that male conical surface is higher than the taper of the conical section of the female inner end portion.

10. The threaded tubular connection according to claim 9, wherein a radial gap is defined between the male conical surface and the conical section of the female inner end portion.

11. The threaded tubular connection according to claim 1, wherein the female inner end portion comprises a groove between the female inner threaded portion and the conical section of the female inner end portion, such that at least part of the inner threaded portion of the male portion is located in the groove once the male portion is connected to the female portion.

12. The threaded tubular connection according to claim 11, wherein the groove comprises a cylindrical portion connected to a steeper tapered portion, the steeper tapered portion being connected to the conical section of the female inner end portion, the steeper tapered portion forming an angle between 5° and 45°, with the longitudinal axis of the first and second tubular components.

13. The threaded tubular connection according to claim 12, wherein the steeper tapered portion has a steeper taper than the taper of the conical section of the female inner end portion.

14. The threaded tubular connection according to claim 1, wherein the inner threaded portion and the outer threaded portion of the female portion and the inner threaded portion and the outer threaded portion of the male portion are tapered at a value ranging from 5.26% to 6.25%.

15. The threaded tubular connection according to claim 1, wherein the inner threaded portion and the outer threaded portion of the female portion and the inner threaded portion and the outer threaded portion of the male portion are tapered at a value between 5.5% and 5.6%.

16. The threaded tubular connection according to claim 1, wherein the inner threaded portion and the outer threaded portion of the female portion and the inner threaded portion and the outer threaded portion of the male portion include trapezoidal teeth, such that a plurality of those trapezoidal teeth being shorter teeth at each longitudinal end.

17. The threaded tubular connection according to claim 16, wherein the teeth include a crest surface and a root surface, both of the crest surface and the root surface being parallel to the longitudinal axis of the tubular component.

18. The threaded tubular connection according to claim 1, wherein the female portion comprises a female outer tapered portion between the female outer threaded portion and the female free end, the male portion comprises a male outer tapered portion defined between the male outer threaded portion and a pipe body of the second tubular, such that the outer tapered portions of the male and female portions contact to form a second fluid tight seal once the male portion is connected to the female portion, outer tapered portions of the male and female portions having a steeper taper than the conical section of the female inner end portion of the female portion, for example with a taper of those outer tapered portions being comprised between 25% and 55%.

19. The threaded tubular connection according to claim 1, wherein the closest extremity and the farthest extremity are on opposite sides of the domed section.

20. The threaded tubular connection according to claim 1, wherein a maximum seal interference point between the domed section and the conical section is located between the closest extremity and the farthest extremity of the domed section.

* * * * *